Patented Nov. 21, 1950

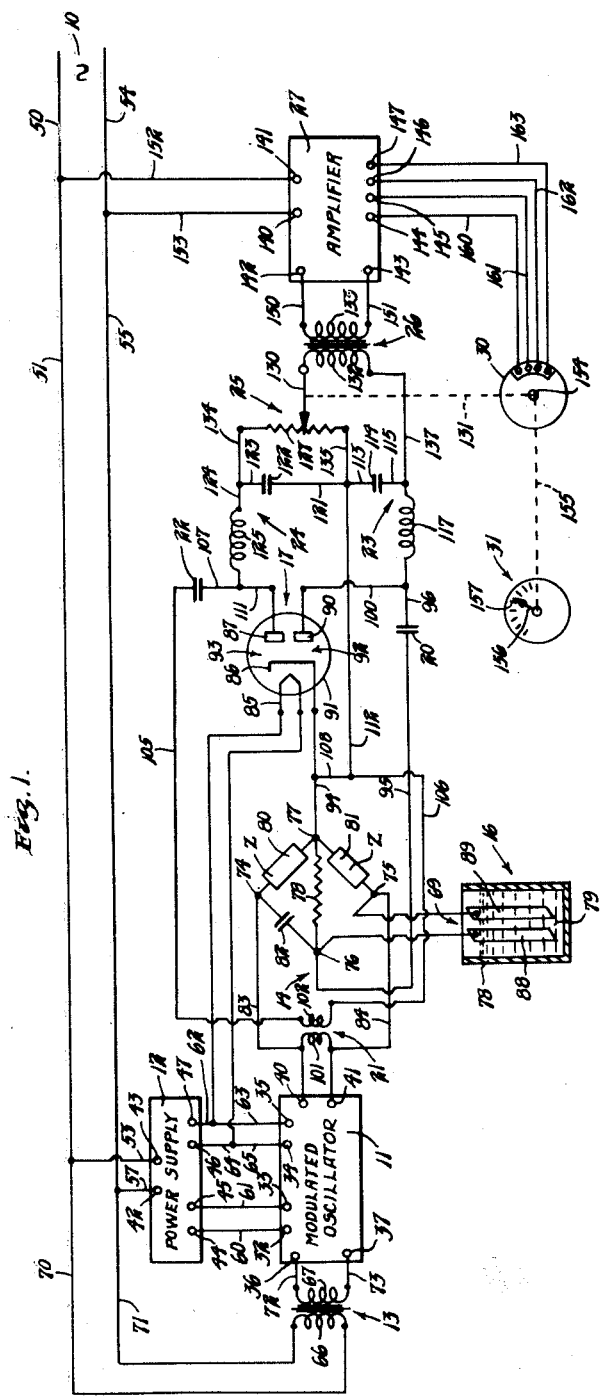

2,530,619

UNITED STATES PATENT OFFICE 2,530,619

LIQUID LEVEL INDICATING MEANS

Waldo H. Kliever, Minneapolis, Minn., assignor to Minneapolis-Honeywell Regulator Company, Minneapolis, Minn., a corporation of Delaware Application June 25, 1945, Serial No. 601,367

17 Claims. (Cl. 318—28)

This invention relates to the field of electrical measuring apparatus, and more particularly to devices of this nature in which an electrical circuit element is arranged for variation with variation in a condition to be measured, and change in the condition is measured by measuring the related change in the circuit element.

The invention comprises an improvement on the instrument disclosed in the copending application Serial No. 579,253 of Curtis R. Schafer, filed February 22, 1945, now forfeited, and assigned to the assignee of the present application.

It is an object of this invention to provide an improved apparatus of the type disclosed in the copending application, wherein the indication of a measuring instrument including an electronic rectifier is made relatively insensitive to variations in the characteristics of the rectifier.

It is another object of the invention to provide an improved measuring system of the type disclosed in the copending application which is relatively insensitive to variation in an input voltage supplied to a condition responsive member.

It is a further object of the invention to provide an improved measuring instrument including a source of input voltage and an electronic rectifier, in which the indication of the system is relatively unaffected by change in the input voltage and by change in the characteristics of the electronic rectifier.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention. In the drawing, Figure 1 is a schematic wiring diagram of a preferred embodiment of my invention, and Figures 2, 3, 4, and 5 are graphical representations of voltage relationships prevailing in my invention.

Figure 1 shows the system as energized from a suitable source 10 of voltage of a power frequency. The system is shown to comprise a high frequency oscillator 11 deriving its plate and filament energy from a power supply 12 and supplied with modulating voltage from source 10 from a transformer 13. The oscillator energizes an impedance bridge 14, one of whose arms comprises a condition responsive impedance member generally indicated by 16. The system also comprises a full wave rectifier tube 17, across one diode of which the bridge output voltage is impressed through a coupling capacitor 20. Across the other diode of tube 17 a voltage derived from oscillator 11 through a transformer 21 is impressed by means of coupling capacitor 22. The rectified or demodulated voltages supplied by the diodes are passed through filters 23 and 24 and then through a variably tapped resistor 25, the latter voltage being impressed across the whole resistance winding, and the former voltage through a circuit including a portion of the winding, so that for any relation between the voltages there is a position of the tap at which no current flows in the diode output circuit influenced by unbalance of the bridge. The circuit referred to is coupled, by means of a transformer 26, to an amplifier 27 which derives its power from source 10, and is effective to control the energization of a motor 30. Operation of the motor is effective to adjust the tap referred to, and also to determine the indication of an indicator 31. The structure of these main components of my system will now be gone into in such further detail as is necessary.

Oscillator 11 is shown as having a pair of filament voltage input terminals 34 and 35, a pair of plate voltage input terminals 32 and 33, a pair of modulating voltage input terminals 36 and 37, and a pair of signal output terminals 40 and 41. The oscillator may be of any suitable type generating a signal of communications frequency—such, for example, as 100 kilocycles—and so arranged as to make possible the modulation of this relatively high frequency voltage at a low or power frequency—such for example as 400 cycles. Such oscillators are well known in the art, and the details of the internal structure of the oscillator are therefore not included in this application. A circuit diagram for such an oscillator is given in Figure 1937 on page 412 of the Radio Amateurs' Handbook, 1944 edition.

The construction of power supply 12 is also the conventional arrangement by which there is derived from the power line an alternating voltage of small amplitude for filament heating and a unidirectional voltage of practically constant magnitude for plate energization, the former customarily being obtained from a filament transformer and the latter through an assembly including a power transformer, a rectifier, and suitable filters. Power supply 12 is shown to comprise input terminals 42 and 43, filament voltage output terminals 46 and 47, and plate output voltage terminals 44 and 45. Power supply unit 12 is energized from source 10 through conductors 50, 51, and 53 and conductors 54, 55, and 57. Plate voltage is supplied to oscillator 11 from power supply 12 through conductors 60 and 61. Filament current is provided to oscillator 11 from power supply 12 through conductors 62 and 63 and conductors 64 and 65.

Transformer 13 is shown to comprise a primary winding 66 and a secondary winding 67.

The function of this transformer is to provide voltage for modulating the high frequency output of oscillator 11 at the lower frequency of source 10, and to that end primary winding 66 is connected to source 10 through conductors 50, 51, and 70 and conductors 54, 55, and 71, while secondary winding 67 is connected to terminals 36 and 37 of oscillator 11 by means of conductors 72 and 73, respectively.

I have shown my measuring instrument as embodied in a device for indicating the amount of fluid in a container. For this purpose, condition responsive device 16 is shown as comprising a pair of electrodes 88 and 89 insulatingly supported in a container 78 for a dielectric fluid 79. With rise and fall of fluid in container 79, the fluid replaces air to a varying degree as the dielectric of the capacitor 69 comprising plates 88 and 89 and therefore the capacitance of the capacitor is varied in accordance with change in the amount of fluid in the container.

Bridge 14 is shown to comprise a pair of input terminals 74 and 75 and a pair of output terminals 76 and 77. A load resistor 78 is connected across output terminals 76 and 77. The ratio arms of the bridge are shown as comprising a pair of impedance members 80 and 81 located in adjacent arms of the bridge; and capacitor 69 comprised in the third arm of the bridge is shown as being compared with a standard capacitor 82 located in the fourth arm of the bridge. The bridge is energized with the modulated output voltage of oscillator 11 through conductors 83 and 84 which connect terminals 40 and 41, respectively, of the oscillator with input terminals 74 and 75 of the bridge.

Full wave rectifier tube 17 is shown to comprise a heater filament 85, a cathode 86, and a pair of anodes 87 and 90, all contained within an evacuated envelope 91. Filament 85 is energized from terminals 46 and 47 of power supply 12. Functionally, the tube is divided into a first diode detector 92 and a second diode detector 93. The output of bridge 14 is applied to diode detector 92, output terminal 77 being connected with cathode 86 by conductor 94, while output terminal 76 is connected with anode 90 by a conductor 95, coupling capacitor 20, and conductors 96 and 100.

Transformer 21 is shown to comprise a primary winding 101 and a secondary 102. The function of this transformer is to energize diode 93 from oscillator 11, and to this end primary winding 101 is connected with the conductors 83 and 84, while secondary winding 102 is connected between cathode 86 and anode 87 by conductor 105, condenser 22, and conductors 107 and 111 and by conductors 106 and 108.

For reasons which will presently be disclosed, filter circuits 23 and 24 are connected in parallel with diodes 92 and 93. Filter circuit 23 may be traced from cathode 86 through conductors 108, 112, and 113, a capacitor 114, conductor 115, an inductor 117, and conductor 109 to plate 90. Filter circuit 24 may be traced from cathode 86 through conductors 108, 112, and 121, a capacitor 122, conductors 123 and 124, an inductor 125, and conductor 111 to plate 87.

Potential divider 25 is shown to comprise a resistance winding 127 and a sliding contactor 130, the latter being actuated mechanically from motor 30 through a link 131 as will presently be described. Transformer 26 is shown as comprising a primary winding 132 and a secondary winding 133. The voltage drop across capacitor 122 is impressed across winding 127 of potential divider 25 by conductors 134 and 135. Slider 130 is connected to one terminal of transformer primary 132 so that the primary winding is connected in series with capacitor 114 and a variable portion of resistance winding 127, depending upon the position of slider 130, through a circuit including conductors 135, 113, 115, and 137.

It is apparent that winding 127 comprises a load circuit for diode 93, and that primary winding 132 and the portion of winding 127 below slider 130 comprise a load circuit for diode 92. These load circuits have as a common portion cathode 86, conductors 108, 112, and 135, and a variable portion of winding 127 depending on the position of slider 130. The current in the load circuit including primary winding 132 is made use of electromagnetically in transformer 26 as a measure of the need for operation of motor 30.

Amplifier 27 may be any suitable amplifier which is effective to control the operation of the motor in a forward or reverse direction in accordance with reversal of the phase of a signal voltage impressed upon the amplifier. Such amplifiers are known in the art (see Anschutz-Kaempfe 1,586,233, for example), and the detailed construction of this amplifier will therefore not be given. Amplifier 27 is shown as comprising a pair of power input terminals 140 and 141, a pair of signal input terminals 142 and 143, and a plurality of power output terminals 144, 145, 146, and 147. The signal input to amplifier 27 is obtained from secondary winding 133 of transformer 26 through conductors 150 and 151 which are connected respectively to input terminals 142 and 143, and power for energizing amplifier 27 is derived from source 10 through conductors 50 and 152 and conductors 54 and 153, completing the circuit between source 10 and input terminals 140 and 141 of amplifier 27.

Motor 30 may be of any suitable type adapted to cooperate with amplifier 27 for reversible energization thereby. The internal mechanical relations between the stator and rotor of this motor are therefore not shown, but the shaft 154 of the motor is shown as connected by link 131 with slider 130 of potential divider 25, and by link 155 with indicator 31. Such reduction gearing as is desired may be provided between motor 30 and links 131 and 155.

Indicator 31 is shown to comprise an index member 156 arranged for movement with respect to a graduated scale 157 in response to the actuation of link 155 by shaft 154 of motor 30. The motor is shown as being energized from amplifier 27 through conductors 160, 161, 162, and 163 connected respectively to terminals 144, 145, 146, and 147 of the amplifier.

By way of illustration I append a tabulation of the circuit constants of one successful embodiment of my invention: operation of the invention is not, however, to be considered as limited to any single set of specific values for the circuit components thereof.

| | |
|---|---|
| Source 10 | 115 volts 400 cycles |
| Oscillator 11 | 100 kilocycles 100% modulated at 400 cycles |
| Bridge input voltage | 50 volts |
| Condenser 82 | 50 micromicrofarads |
| Condenser 22 | 100 micromicrofarads |
| Condenser 20 | 100 micromicrofarads |
| Condenser 122 | .04 microfarad |
| Condenser 114 | .04 microfarad |

| | |
|---|---|
| Capacitance empty tank | 50 micromicrofarads |
| Impedances 80 and 81 | 50 millihenries |
| R. F. chokes 117 and 125 | 50 millihenries |
| Potential divider 25 | 10,000 ohms |
| Resistor 78 | .1 megohm |
| Tube used | 7E6 |
| Transformer 26 | Audio frequency 1:1 ratio |
| Transformer 21 | Radio frequency 1:1 ratio |

Operation

The operation of my invention will be best understood if reference is made to Figures 2, 3, 4, and 5. On energization of the system from source 10, oscillator 11 is energized through power supply 12 and modulation transformer 13, and impresses upon the input terminals 74 and 75 of bridge 14 an alternating voltage having the wave shape shown in curve 170 of Figure 2. It will be seen that this voltage alternates about a zero value indicated by line 171 at the frequency of oscillator 11, and that the amplitude of each alternation varies, due to the effect of transformer 13, in such a fashion that the envelope of the wave train, indicated by the lines 173 and 174, corresponds to the wave form of the modulating voltage supplied by source 10.

As is well known to those skilled in the art, the nature of bridge 14 is such that, so long as the ratio of the impedance of capacitor 69 to that of standard capacitor 82 is the same as the ratio between the impedances 81 and 80, no output voltage appears across load resistor 78. If, on the other hand, the first ratio is not equal to the second ratio, a voltage having the wave shape and frequency indicated by curve 170 appears across load resistor 78, the voltages when the first ratio is greater and when it is less than the second ratio being displaced in phase by 180 degrees of the carrier voltage. In my invention, however, I do not propose to use the bridge so broadly, in that I do not contemplate making use of the phase reversal properties of the bridge. I propose simply to adjust the bridge so that it is in balance when the container is empty of fluid. Unbalance of the bridge due to change in the impedance of capacitor 69 as the fluid level rises then results in a bridge output voltage which, although it varies in amplitude, does not vary in its time-phase relationship regardless of what change takes place in the amount of fluid in tank 78. Figure 2, therefore, is also illustrative of the wave shape of the output voltage derived from bridge 14, if it is understood that the maximum amplitude of curve 170, indicated at 172, varies with variation in the amount of fluid in the tank.

The bridge output voltage is impressed between the plate and cathode of diode 92, which comprises a low resistance path in parallel with the bridge output resistor whenever anode 90 of the diode is positive, and functions substantially as an infinite resistance whenever the anode is negative with respect to the cathode. Since limited power is available from the voltage drop across resistor 78, the voltage drop between cathode 86 and anode 90 of diode 92 falls off practically to zero during those half cycles of the high frequency voltage when the plate is positive. The wave shape of the voltage actually existing between cathode and anode of the diode is therefore illustrated in Figure 3, the voltage following the interrupted high frequency curve 180, whose upper envelope is shown at 183, and whose lower envelope, not shown to avoid complicating the drawing, is substantially a straight line coincident with the zero value of voltage. It is realized that in practical applications of electron tubes, non-linearity and other peculiarities of the tube characteristics have a minor distorting effect upon the lower envelope of this voltage curve, but for all practical purposes the relationships just recited hold true.

Curve 180 of Figure 3 may be analyzed into two principal components, shown in curves 184 and 185 of Figure 4: components of other frequencies may be found in curve 180, but they comprise so slight a proportion of the total voltage as to be negligible. It may therefore be assumed that across filter 23 there is impressed a pair of voltages such as is shown in Figure 4.

The impedance of capacitor 114 to a voltage having the frequency of curve 185 is low, while its impedance to a voltage having the frequency of curve 184 is high. The voltage drop across capacitor 114 therefore has a major component of the frequency of curve 184, which it will be recalled is also the frequency of source 10, and the voltage tends to cause a flow of current from condenser 114 through primary winding 132 of transformer 26, tap 130, and the lower portion of winding 127 of potential divider 25.

The operation of diode 93 is similar to that just recited for diode 92, and will not be illustrated step by step as with the operation of diode 92. Alternating voltage derived from oscillator 11 through transformer 21 is impressed between cathode 86 and anode 87 and the resulting voltage drop between the cathode and anode has the same wave shape as that across diode 92. The voltage drop across capacitor 122 is therefore also predominantly of the frequency of source 10, and this voltage is impressed across the whole length of winding 127 of potential divider 25. This voltage remains of constant amplitude regardless of change in the balance condition of the bridge, and serves as a comparison voltage for the output of diode 92. If the voltage of oscillator 11 should change, the voltages across both diodes change in proportion. The effect of such voltage variation is therefore minimized.

Neglecting such phase shift as may be introduced by the apparatus used, and which may be corrected for by suitable conventional methods, it will be appreciated that the voltage drop across condenser 122 is either in phase with that across condenser 114 or 180 degrees out of phase therewith, depending upon the mode of connection of transformers 13 and 21 and their respective circuits. For a proper operation of my invention, the transformers must be so connected that for any particular instantaneous value of source 10 the potential increases in a single direction from conductor 135 whether it be measured along the whole length of winding 127 or through a portion of winding 127 and then through slider 130 and primary winding 132 of transformer 26. The voltages supplied by oscillator 11 and transformer 21 are so chosen that when the capacitance of capacitor 69 is greatest, corresponding to a full container, the voltage drop across condenser 114 is equal to that across the entire resistance winding 127. The two voltages, being in phase and arranged in opposition, buck one another out so that no current flows in primary winding 132. This is best shown in Figure 5, where curve 190 is the voltage across the entire resistance winding 127, curve 191 is that across the lower portion of the winding as determined by the position of tap 130, and curve 192 is that across condenser 114. The system is in balance when curves 101 and 102 are opposite in phase and equal in amplitude.

If at any time the level of fluid in the tank rises, the bridge output also increases, so that the voltage drop across condenser 114 approaches that across resistance winding 127; current of a first phase flows in primary winding 132 in a first direction. However, by moving slider 130 upward, the voltage drop across condenser 114 may be opposed by a larger and larger portion of that across the resistance winding until a value of the latter is found which is just equal to the voltage across the condenser. The flow of current in primary winding 132 then ceases.

If the level of liquid in the tank falls, the voltage across condenser 114 falls off as compared to that across the portion of the resistance winding determined by the position of slider 130, and current again flows in the primary winding 132. This current is of the opposite phase to that first described, but its flow can also be caused to cease by movement of slider 130 downward until the voltages again are equal.

The current in winding 132 having the first phase just recited is effective to energize motor 30 to operate in a first direction, causing indicator 31 to move toward "full," and simultaneously causing slider 130 to move upward along resistance winding 127 until the voltages are equal. Similarly, current of the second phase flowing in primary winding 132 is effective to energize motor 30 to operate in the opposite direction, causing indicator 31 to move toward "empty," and simultaneously causing slider 130 to move downward along resistance winding 127 until the voltages are again equal.

Numerous objects and advantages of my invention have been set forth in the foregoing description together with details of the structure and function of the invention, and the novel features thereof are pointed out in the appended claims. The disclosure, however, is illustrative only, and I may make changes in detail, especially in matter of shape, size and arrangement of parts, within the principle of the invention, to the full extent indicated by the broad general meaning of the terms in which the appended claims are expressed.

I claim as my invention:

1. A device of the class described comprising, in combination: a source of alternating voltage of a signal frequency modulated at a power frequency; an impedance bridge; means energizing said bridge from said source; means varying the balance of said bridge in response to a condition, whereby to vary the amplitude of the voltage output of said bridge; an asymmetrically conducting member comprising an electron discharge device including an electron-emissive cathode and a plurality of anodes; coupling means impressing said output voltage between said cathode and one of said anodes, whereby to cause the flow of a first pulsating unidirectional current through said member; means deriving from said pulsating current a voltage component of said power frequency, the amplitude of said component varying with the degree of unbalance of said bridge; further coupling means impressing voltage from said source between said cathode and another of said anodes, whereby to cause the flow of a second pulsating unidirectional current through said member; means deriving from said second pulsating current a second voltage component of said power frequency and of constant amplitude; means, including a variably tapped resistor, whereby upon adjustment of said tap said first voltage component may be opposed by an equal and opposite voltage comprising a portion of said second voltage component; and means responsive to flow of current in said last means.

2. A device of the class described comprising, in combination: a source of alternating voltage of a signal frequency modulated at a power frequency; an impedance bridge; means energizing said bridge from said source; means varying the balance of said bridge in response to a condition, whereby to vary the amplitude of the voltage output of said bridge; an asymmetrically conducting member comprising an electron discharge device including an electron-emissive cathode and a plurality of anodes, coupling means impressing said output voltage between said cathode and one of said anodes, whereby to cause the flow of a first pulsating unidirectional current through said member; means deriving from said pulsating current a voltage component of said power frequency, the amplitude of said component varying with the degree of unbalance of said bridge; further coupling means impressing voltage from said source between said cathode and another of said anodes, whereby to cause the flow of a second pulsating unidirectional current through said member; means deriving from said second pulsating current a second voltage component of said power frequency and of constant amplitude; means, including a variably tapped resistor, whereby upon adjustment of said tap said first voltage component may be opposed by an equal and opposite voltage comprising a portion of said second voltage component; a motor; and means energizing said motor in accordance with the phase of the preponderant one of said opposed components.

3. A device of the class described comprising, in combination: a source of alternating voltage of a signal frequency modulated at a power frequency; an impedance bridge; means energizing said bridge from said source; means varying the balance of said bridge in response to a condition whereby to vary the amplitude of the voltage output of said bridge; an asymmetrically conducting member comprising an electron discharge device including an electron-emissive cathode and a plurality of anodes; coupling means impressing said output voltage between said cathode and one of said anodes, whereby to cause the flow of a first pulsating unidirectional current through said member; means deriving from said pulsating current a voltage component of said power frequency, the amplitude of said component varying with the degree of unbalance of said bridge; further coupling means impressing voltage from said source between said cathode and another of said anodes, whereby to cause the flow of a second pulsating unidirectional current through said member; means deriving from said second pulsating current a second voltage component of said power frequency and of constant amplitude; means, including a variably tapped resistor, whereby upon adjustment of said tap said first voltage component may be opposed by an equal and opposite voltage comprising a portion of said second voltage component; means energizing said motor in accordance with the phase of the preponderant one of said opposed components; and means actuated by said motor for operating said tap to vary the portion of said second component opposing said first component.

4. A device of the class described comprising, in combination: a source of alternating voltage of a signal frequency modulated at a power frequency; means varying the amplitude of modulated voltage from said source in response to a condition; demodulating means energized with voltages from said last named means and from said source; means connecting voltage drops across said demodulating means in opposition, said means comprising a low-pass filter energized by each said voltage drop, a resistor having an adjustable tap, means impressing the output of one of said filters across said resistor, and means comparing the output of the other of said filters with the voltage across a variable portion of said resistor determined by the position of said tap, whereby upon adjustment of said tap the voltage supplied by said last named filter may be opposed by an equal and opposite voltage comprising a portion of the voltage supplied by the other of said filters; and means responsive to the relation between said opposed voltages.

5. A device of the class described comprising, in combination: a source of alternating voltage of a signal frequency modulated at a power frequency; means varying the amplitude of modulated voltage from said source in response to a condition; demodulating means energized with voltages from said last named means and from said source; means connecting voltage drops across said demodulating means in opposition, said means comprising a low-pass filter energized by each said voltage drop, a resistor having an adjustable tap, means impressing the output of one of said filters across said resistor, and means comparing the output of the other said filters with the voltage across a variable portion of said resistor determined by the position of said tap, whereby upon adjustment of said tap the voltage supplied by said last named filter may be opposed by an equal and opposite voltage comprising a portion of the voltage supplied by the other of said filters; a motor; and means energizing said motor in accordance with the relation between said opposed voltages.

6. A device of the class described comprising, in combination: a source of alternating voltage of a signal frequency modulated at a power frequency; means varying the amplitude of modulated voltage from said source in response to a condition; demodulating means energized with voltages from said last named means and from said source; means connecting voltage drops across said demodulating means in opposition, said means comprising a low-pass filter energized by said voltage drop, a resistor having an adjustable tap, means impressing the output of one of said filters across said resistor, and means comparing the output of the other of said filters with the voltage across a variable portion of said resistor determined by the position of said tap, whereby upon adjustment of said tap the voltage supplied by said last named filter may be opposed by an equal and opposite voltage comprising a portion of the voltage supplied by the other of said filters; means energizing said motor in accordance with the relation between said opposed voltages; and means actuated by said motor for adjusting said tap to vary the voltage opposing the output of said last named filter.

7. A device of the class described comprising, in combination: a first source of alternating voltage of a power frequency; a second source of alternating voltage of a carrier frequency modulated by said first named voltage; a bridge including condition responsive means for affecting the balance thereof; a voltage balancing network including means for adjusting the same; means energizing said bridge from said second source; asymmetrically conducting means applying voltages to said network from said second source and from said bridge; a reversible motor; an indicator; means connecting said motor in driving relation to said indicator and to said network adjusting means; and means energizing said motor for operation, in accordance with the phase relation between the voltage of said first source and any unbalance of said voltage comparing network, so as to rebalance the latter.

8. A device of the class described comprising, in combination: a source of alternating voltage of a carrier frequency modulated at a power frequency; a measuring circuit and a comparison circuit energized from said source, said measuring circuit comprising a normally balanced bridge, a first demodulator, and a first filter network, and said comparison circuit comprising a second demodulator and a second filter network; condition responsive means varying the state of balance of said bridge whereby to vary the voltage supplied by said filter in said measuring circuit, an adjustable voltage balancing network; means energizing said network from said measuring circuit and said comparison circuit; a motor; means energizing said motor in accordance with a characteristic of any unbalance voltage appearing in said network; and means actuated by said motor to adjust said network so as to restore a condition of balance therein.

9. In a device of the class described, in combination: a first source of alternating voltage, of varying amplitude, including a carrier frequency component modulated at a power frequency component; a second source of periodic voltage, of fixed amplitude, including at least a component of said power frequency; a voltage divider; means, including an asymmetrically conducting member, applying voltage of said power frequency from said second source across said voltage divider; means, including an asymmetrically conducting member, for deriving from said first source a voltage of said power frequency related in magnitude to the amplitude of said first periodic voltage; and power frequency means responsive to inequality between said derived voltage and the voltage drop in a selected portion of said unit due to said first applied voltage.

10. Apparatus employing voltage alternating at a relatively high frequency for controlling the energization of a device operable by voltage alternating at a relatively low frequency comprising, in combination: first and second sources supplying alternating voltages of a carrier frequency modulated at a power frequency; means varying the output voltage supplied by one of said sources in accordance with the value of a condition; demodulating means; means, including connections between said demodulating means and said sources, for producing output voltages of said power frequency in accordance with the envelopes of the voltages supplied by said sources; and means connecting said output voltages in phase opposition to produce a resultant voltage of power frequency having one phase or the other depending on the relative magnitude of said output voltages.

11. Apparatus employing voltage alternating at a relatively high frequency for controlling the energization of a device operable by voltage alternating at a relatively low frequency comprising, in combination: first and second sources supplying alternating voltages of a carrier frequency modulated at a power frequency; means varying the output voltage supplied by one of said sources in accordance with the value of a condition; demodulating means; means, including connections between said demodulating means and said sources, for producing output voltages of said power frequency in accordance with the envelopes of the voltages supplied by said sources; and means connecting said output voltages in phase opposition to produce a resultant voltage of power frequency having one phase or the other depending on the relative magnitude of said output voltages, and means for energizing a device operable by voltage of said power frequency in accordance with the phase of said resultant voltage.

12. Apparatus employing voltage alternating at a relatively high frequency for controlling the energization of a device operable by voltage alternating at a relatively low frequency comprising, in combination: first and second sources supplying alternating voltages of a carrier frequency modulated at a power frequency; means varying the output voltage supplied by one of said sources in accordance with the value of a condition; demodulating means; means, including connections between said demodulating means and said sources, for producing output voltages of said power frequency in accordance with the envelopes of the voltages supplied by said sources; and means connecting said output voltages in phase opposition to produce a resultant voltage of power frequency having one phase or the other depending on the relative magnitude of said output voltages, a device operable by voltage of said power frequency, and means energizing said device in accordance with the phase of said resultant voltage.

13. Apparatus employing voltage alternating at a relatively high frequency for controlling the energization of a device operable by voltage of a relatively low frequency comprising, in combination: first and second sources supplying alternating voltages of a carrier frequency modulated at a power frequency; means varying the output voltage supplied by one of said sources in accordance with the value of a condition; first and second diode detectors; means, including connections between said detectors and said sources, for producing output voltages of said power frequency in accordance with the envelopes of the voltages supplied by said sources; means connecting said output voltages in phase opposition to produce a resultant voltage of power frequency having one phase or the other depending on the relative magnitudes of said output voltages; and means for energizing a device operable by voltage of said power frequency in accordance with the phase of said resultant voltage.

14. A device of the class described comprising, in combination: a source of modulated alternating voltage of a carrier frequency modulated at a power frequency, having a substantially constant amplitude; a first diode detector; means impressing said signal voltage upon said first detector to give a first power frequency voltage output; means varying the amplitude of voltage from said source in response to a condition to provide a variable voltage; a second diode detector; means impressing said variable voltage upon said second detector to give a second power frequency voltage output; means connecting said power frequency outputs in phase opposition to give a resultant voltage of said power frequency having one phase or the other depending upon the relative magnitudes of said voltage outputs; and power frequency means actuated in accordance with the phase of said resultant voltage.

15. A device of the class described, comprising, in combination: power means supplying an alternating voltage, of a carrier frequency modulated at a power frequency, having a substantially constant amplitude; condition responsive means supplying an alternating voltage of substantially the same wave form and of varying amplitude; a plurality of demodulating means; a plurality of load circuits having in common a variable portion of a resistor; means energizing said load circuits from said power means and said condition responsive means, under the control of said demodulating means, to give voltage outputs having components of said power frequency; and power frequency means actuated in accordance with the current in one of said load circuits.

16. A device of the class described comprising, in combination: a plurality of balanceable networks; a source of complex alternating voltage having substantial components of different frequencies; means energizing a first of said networks from said source; asymmetrically conducting means energizing the second of said networks with components of said complex voltage derived jointly from said source and said first network; condition responsive means for varying the state of balance of said first network; motor means operated by one of said components of said complex voltage for varying the state of balance of said second network; and means energizing said motor with said component of said complex voltage on unbalance of said second network so as to cause actuation of said motor means to rebalance said network.

17. In a device of the class described. in combination: a first source of alternating voltage of variable amplitude, including a carrier frequency component modulated at a power frequency; a second source of periodic voltage of fixed amplitude, including at least a component of said power frequency; means deriving from said second source a voltage of said power frequency related in amplitude thereto; means deriving from said first source a voltage of said power frequency and of constant amplitude; means connecting said derived voltages in phase opposition; and power frequency means responsive to inequality between said derived voltages.

WALDO H. KLIEVER.

REFERENCES CITED

The following references are of record in the file of this patent:

UNITED STATES PATENTS

| Number | Name | Date |
| --- | --- | --- |
| 2,039,405 | Green et al. | May 5, 1936 |
| 2,113,436 | Williams | Apr. 5, 1938 |
| 2,183,725 | Seeley | Dec. 19, 1939 |
| 2,310,955 | Hornfeck | Feb. 16, 1943 |
| 2,322,498 | Zeitlin | June 22, 1943 |
| 2,410,289 | Kellogg | Oct. 29, 1946 |
| 2,424,568 | Isbister et al. | July 29, 1947 |
| 2,433,195 | Bond | Dec. 23, 1947 |
| 2,436,807 | Isbister | Mar. 2, 1948 |
| 2,441,568 | Finison | May 18, 1948 |